(12) United States Patent
Kouketsu et al.

(10) Patent No.: US 9,234,586 B2
(45) Date of Patent: *Jan. 12, 2016

(54) LINEAR ACTUATOR AND VACUUM CONTROL DEVICE

(71) Applicant: CKD CORPORATION, Komaki-shi, Aichi (JP)

(72) Inventors: Masayuki Kouketsu, Komaki (JP); Hiroshi Itafuji, Komaki (JP)

(73) Assignee: CKD CORPORATION, Komaki-Shi, Aichi (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/519,426

(22) Filed: Oct. 21, 2014

(65) Prior Publication Data

US 2015/0033941 A1    Feb. 5, 2015

Related U.S. Application Data

(63) Continuation of application No. PCT/JP2013/055545, filed on Feb. 28, 2013.

(30) Foreign Application Priority Data

Apr. 23, 2012 (JP) ................................ 2012-097700

(51) Int. Cl.
*F16K 31/00* (2006.01)
*F16K 31/02* (2006.01)
(Continued)

(52) U.S. Cl.
CPC .............. *F16J 1/01* (2013.01); *F15B 15/1461* (2013.01); *F16K 31/1221* (2013.01); *F16K 41/04* (2013.01); *F16K 51/02* (2013.01); *G05D 16/10* (2013.01); *G05D 16/2013* (2013.01)

(58) Field of Classification Search
CPC .................................... F16J 1/01; F16K 51/02
USPC .................................................. 251/63.5, 326
See application file for complete search history.

(56) References Cited

U.S. PATENT DOCUMENTS 5,178,366 A   1/1993   Kojima et al.
6,289,737 B1  9/2001   Kouketsu et al.
(Continued)

FOREIGN PATENT DOCUMENTS

JP   51-27930 U   2/1976
JP   60-77703 U   5/1985
(Continued)

OTHER PUBLICATIONS

Search Report in International Application No. PCT/JP2013/055545 dated Apr. 9, 2013.
(Continued)

*Primary Examiner* — John K Fristoe, Jr.
*Assistant Examiner* — Kelsey Rohman
(74) *Attorney, Agent, or Firm* — Beyer Law Group LLP

(57) ABSTRACT

A linear actuator is used with a vacuum chamber in which plasma is generated. The linear actuator comprises a moving member extending between the exterior and the interior of the vacuum chamber through an opening provided in the vacuum chamber so as to be rectilinearly reciprocated, a drive section configured to reciprocate the moving member, a cover that covers the moving member, and a slide seal section that provides a seal between the interior and the exterior of the vacuum chamber while allowing the cover to slide thereon. The cover covers a range of the moving member which is moved into both of the interior and the exterior of the vacuum chamber while the moving member is reciprocated by the drive section, and an outer surface of the cover is smaller in the amount of gas adsorption per unit area than an outer surface of the moving member.

17 Claims, 10 Drawing Sheets

(51) Int. Cl.
*F16J 1/01* (2006.01)
*F16K 51/02* (2006.01)
*G05D 16/10* (2006.01)
*F16K 31/122* (2006.01)
*F16K 41/04* (2006.01)
*F15B 15/14* (2006.01)
*G05D 16/20* (2006.01)

(56) References Cited

U.S. PATENT DOCUMENTS

| | | | |
|---|---|---|---|
| 7,328,881 B2 | 2/2008 | Sakurai et al. | |
| 8,210,196 B2 * | 7/2012 | Itafuji et al. | 137/114 |
| 2003/0116193 A1 | 6/2003 | Fukuda | |
| 2006/0169940 A1 * | 8/2006 | Mayer et al. | 251/301 |
| 2008/0173842 A1 | 7/2008 | Sakurai | |
| 2010/0032607 A1 | 2/2010 | Takei et al. | |
| 2010/0327203 A1 | 12/2010 | Nagai et al. | |
| 2013/0313458 A1 | 11/2013 | Kouketsu et al. | |

FOREIGN PATENT DOCUMENTS

| | | |
|---|---|---|
| JP | 61-119874 | 6/1986 |
| JP | 1-117905 | 5/1989 |
| JP | 03-260072 | 11/1991 |
| JP | 5-118447 | 5/1993 |
| JP | 5-23841 U | 6/1993 |
| JP | 6-6835 U | 1/1994 |
| JP | 6-101782 | 4/1994 |
| JP | 2000-130635 | 5/2000 |
| JP | 2000-163137 | 6/2000 |
| JP | 2001-200346 | 7/2001 |
| JP | 2003-42339 | 2/2003 |
| JP | 2003-194257 | 7/2003 |
| JP | 2005-30459 | 2/2005 |
| JP | 2008-95777 | 4/2008 |
| JP | 2008-275119 | 11/2008 |
| JP | 2009-68607 | 4/2009 |
| JP | 2009-117444 | 5/2009 |
| JP | 2010-276096 | 12/2010 |

OTHER PUBLICATIONS

Search Report in International Application No. PCT/JP2011/076756 dated Dec. 27, 2011.

Office Action dated Jun. 29, 2015 for U.S. Appl. No. 13/957,299.

* cited by examiner

LINEAR ACTUATOR AND VACUUM CONTROL DEVICE

CLAIM OF PRIORITY

This application is a Continuation of International Patent Application No. PCT/JP2013/055545, filed on Feb. 28, 2013, which claims priority to Japanese Patent Application No. 2012-097700, filed on Apr. 23, 2012, each of which is hereby incorporated by reference.

BACKGROUND OF THE INVENTION

1. Field of the Invention

The present invention relates to a linear actuator and a vacuum control device for use with a vacuum chamber in which plasma is generated.

2. Description of the Related Art

Manufacturing semiconductor devices involves a process which uses plasma; for example, plasma etching. In the plasma etching process, for example, a vacuum control valve controls a vacuum pressure in a vacuum chamber while allowing etching gas to flow. A vacuum is controlled through adjustment of conductance of the vacuum control valve. In the case of a pendulum-type vacuum control valve used widely in plasma etching, valve opening is adjusted through operation of a pendulum-type valve body, thereby adjusting conductance (Japanese Patent Application Laid-Open (kokai) No. 2009-117444). However, since controllability of operation of the pendulum-type valve body is low in a low flow rate region (low conductance region), the pendulum-type vacuum control valve involves a problem of failure to cope with a low flow rate of etching gas. Meanwhile, a poppet-type vacuum control valve which copes with a low flow rate of etching gas is conventionally used to control a vacuum. The poppet-type vacuum valve is configured such that a valve body is attached to a piston (moving member) of a linear actuator. Through control of the distance between the valve body and a valve seat (lift), conductance is adjusted (Japanese Patent Application Laid-Open (kokai) No. 2010-276096). The linear actuator employed in the poppet-type vacuum control valve uses bellows for sealing a slide section of the piston. Since the bellows is made of metal and, thus, does not have plasma resistance, difficulty is encountered in using the poppet-type vacuum control valve in a vacuum chamber which handles plasma. Japanese Patent Application Laid-Open (kokai) No. 2003-194257, Japanese Patent Application Laid-Open (kokai) No. 2000-130635, and Japanese Patent Application Laid-Open (kokai) No. H03-260072 also describe a valve apparatus.

BRIEF DESCRIPTION OF THE INVENTION

Thus, conventionally, there exists no linear actuator which can be used with a vacuum chamber in which plasma is generated, and which can rectilinearly move a valve body or the like while a high vacuum level is maintained within the vacuum chamber.

The present invention has been conceived to solve the above-mentioned conventional problem, and an object of the invention is to provide a linear actuator which can be used with a vacuum chamber in which plasma is generated.

Implementations for solving the above problem will next be described while referring to effects, etc., as needed.

In accordance with a first implementation, a linear actuator for use with a vacuum chamber in which plasma is generated is provided. The linear actuator comprises a moving member which extends between the exterior and the interior of the vacuum chamber through an opening provided in the vacuum chamber and which is configured to be rectilinearly reciprocated; a drive section which is configured to reciprocate the moving member; a cover for covering the moving member; and a slide seal section for providing a seal between the interior and the exterior of the vacuum chamber while allowing the cover to slide thereon, wherein the cover covers a range of the moving member which is moved into both of the interior and the exterior of the vacuum chamber in the course of reciprocation of the moving member by the drive section, and an outer surface of the cover is smaller in the amount of gas adsorption per unit area than an outer surface of the moving member.

According to the first implementation, the cover covers a range of the moving member which is moved into the interior of the vacuum chamber and the exterior of the vacuum chamber. Also, the outer surface of the cover is smaller in the amount of gas adsorption per unit area than the outer surface of the moving member. Therefore, gas is unlikely to be adsorbed on the cover which is moved into the exterior of the vacuum chamber, thereby favorably restraining conveyance into the vacuum chamber of gas adsorbed on the cover. That is, through restraint of adsorption of gas on the moving member, the vacuum chamber can be reliably sealed.

In the case where the cover covers only a range of the moving member which is moved into the interior and the exterior of the vacuum chamber, the cover is reduced in size, and, thus, material cost can be reduced as compared with the case where the cover covers the entire moving member.

In accordance with a second implementation, in the linear actuator according to the first implementation, the moving member has an attachment section provided at its end on the side in the interior of the vacuum chamber, the attachment section having an amount of gas adsorption per unit area larger than that of the outer surface of the cover.

According to the second implementation, since the moving member has the attachment section at its end, a valve, for example, can be attached to the moving member through the attachment section. The attachment section is provided at the end of the moving member on the side in the interior of the vacuum chamber and is located within the vacuum chamber at all times. Therefore, the attachment section is not moved into the exterior of the vacuum chamber; thus, there is no risk of adsorption of gas on the attachment section in the exterior of the vacuum chamber. Therefore, the attachment section can be larger in the amount of gas adsorption than the outer surface of the cover. That is, there is no need to form the attachment section from a dense material as in the case of the cover, whereby the costs of material and machining can be reduced.

In accordance with a third implementation, in the linear actuator according to the first implementation, the cover comprises an electrically insulating sintered body formed through firing of an electrically insulating nonmetallic material.

According to the third implementation, since the cover comprises an electrically insulating sintered body formed through firing of an electrically insulating nonmetallic material, the cover can have high plasma resistance by virtue of excellent electrically insulating properties of the sintered body. Also, the employment of the sintered body improves rigidity of the cover to thereby effectively restrain deterioration in a sealing structure, and can contribute to a reduction in the surface area (improvement in density) of the cover. That is, the employment of the sintered body having a smooth surface as the cover can restrain an increase in surface area which could otherwise result from surface roughness.

Meanwhile, the inventors of the present invention have found the following: even though anode oxidation film is formed on the surface of an aluminum moving member, and pore-filling is performed on the anode oxidation film, the surface of the moving member still has a large number of pits and projections. Thus, through employment of the sintered body whose surface is less roughened as compared with the anode oxidation film, the amount of gas adsorption on the cover can be markedly reduced.

In accordance with a fourth implementation, in the linear actuator according to the third implementation, the sintered body is formed of ceramic formed through firing of aluminum oxide.

According to the fourth implementation, since the sintered body is formed of ceramic formed through firing of aluminum oxide, by virtue of material characteristics of ceramic, high structural strength and high electrical insulation can be implemented.

In accordance with a fifth implementation, in the linear actuator according to the first implementation, the moving member is formed of a metal material.

According to the fifth implementation, since the moving member is covered with the cover as mentioned above, a metal material having no plasma resistance can be employed for forming the moving member.

In accordance with a sixth implementation, in the linear actuator according to the fifth implementation, the moving member is formed of aluminum.

According to the sixth implementation, since aluminum, which is a common metal material, is used to form the moving member, the moving member can be readily manufactured.

In accordance with a seventh implementation, in the linear actuator according to the second implementation, the attachment section is formed of a metal material whose surface is subjected to surface oxidization.

According to the seventh implementation, since the attachment section is formed of a metal material whose surface is oxidized, electrical insulation of the attachment section is secured; thus, even though the attachment section is exposed to the interior of the vacuum chamber, the attachment section is unlikely to be affected by plasma.

In accordance with a eighth implementation, in the linear actuator according to the seventh implementation, the attachment section is formed of aluminum, and the surface oxidization is alumite treatment.

According to the eighth implementation, since the attachment section is formed of aluminum, and alumite treatment is employed as surface oxidization, even though the attachment section is exposed to the interior of the vacuum chamber, adverse effect of plasma on the attachment section can be favorably restrained.

In accordance with a ninth implementation, in the linear actuator according to the first implementation, the linear actuator further comprises a guide rod connected to the moving member and extending along an axis of the moving member, and a guide for guiding the guide rod along a moving direction of the moving member.

According to the ninth implementation, since the guide guides the guide rod, the moving member can move stably. Therefore, the slide seal section on which the moving member slides does not need to have a guide for guiding the moving member, whereby there can be prevented deterioration in the sealing capability of the slide seal section which could otherwise result from provision of the guide.

In accordance with a tenth implementation, in the linear actuator according to the second implementation, further comprises an operation member which is attached to the attachment section and is configured to operate in the interior of the vacuum chamber.

According to the tenth implementation, since the operation member is attached to the attachment section, working can be performed within the vacuum chamber through operation of the operation member.

In accordance with a eleventh implementation, in the linear actuator according to the tenth implementation, further comprises an insertion passage for allowing a control line for controlling operation of the operation member to be inserted into the operation member from the exterior of the vacuum chamber.

According to the eleventh implementation, the control line for controlling the operation member can be inserted through the insertion passage and connected to the operation member.

In accordance with a twelfth implementation, in the linear actuator according to the first implementation, the cover is provided such that a predetermined gap is formed between the same and an outer surface of the moving member through a pair of elastic seal members which are disposed away from each other in a moving direction of the moving member, and the pair of elastic seal members is elastically in contact with the outer surface of the moving member and seals the predetermined gap.

According to the twelfth implementation, a pair of the elastic seal members is provided in elastic contact with the moving member so as to seal the gap between the cover and the moving member. Thus, even though the cover and the moving member differ in thermal expansion as a result of variation of ambient temperature, the elastic seal members can absorb the difference in thermal expansion. Therefore, the degree of freedom increases in selection of material for the cover and the moving member. For example, while a metal material having excellent strength and toughness (e.g., aluminum) is selected as material for the moving member, a sintered body of aluminum oxide having excellent electrical insulation can be selected as material for the cover.

In accordance with a thirteenth implementation, in the linear actuator according to the first implementation, the slide seal section has a slide surface on which the cover slides, a first slide seal member and a second slide seal member which are disposed away from each other in a moving direction of the moving member and which define a vacuum slide chamber between the slide surface and the cover, and a vacuum evacuation channel which communicates with the vacuum slide chamber. The first slide seal member is in contact with an outer surface of the cover and provides a seal between the vacuum slide chamber and the interior of the vacuum chamber; the second slide seal member is in contact with the outer surface of the cover and provides a seal between the vacuum slide chamber and the exterior of the vacuum chamber as well as the exterior of the vacuum slide chamber; and the vacuum slide chamber is vacuum-evacuated through the vacuum evacuation channel.

According to the linear actuator of the thirteenth implementation, since the vacuum slide chamber which can be vacuum-evacuated is formed in such a manner as to face the slide surface on which the cover slides, vacuum evacuation can be performed for a portion of the cover which faces the vacuum slide chamber. Therefore, adsorption of gas on the cover can be further restrained, and the interior of the vacuum chamber can be reliably sealed. Furthermore, since the vacuum slide chamber is vacuum-evacuated, dust adhering to the cover can be removed, whereby there can be favorably restrained entry, into the vacuum chamber, of foreign matter adsorbed on the cover. Also, by means of the first slide seal member and the second slide seal member being provided away from each other in the moving direction of the moving member, the vacuum slide chamber assumes the form of a region extending in the moving direction of the moving member. Therefore, a region of the cover which can be subjected to vacuum evacuation in the vacuum slide chamber can be secured in the moving direction of the moving member; thus, a possible range of vacuum evacuation for the moving member can be increased.

Meanwhile, in the case where the moving member is reciprocated in such a manner that there arises a portion of the cover which faces the interior of the vacuum chamber and the exterior of the vacuum slide chamber (the exterior of the vacuum chamber), gas may possibly be adsorbed in a slight amount on a portion of the cover which has faced the exterior of the vacuum slide chamber. However, since the portion is subjected to vacuum evacuation during passage through the vacuum slide chamber, there can be restrained conveyance into the vacuum chamber of gas adsorbed on the cover.

In accordance with a fourteenth implementation, in the linear actuator according to the thirteenth implementation, the first slide seal member has an elastic member having a forked lip whose lip pieces are in contact with the slide surface and the cover, respectively, and an urging member which urges the lip pieces of the forked lip toward mutually opposite directions.

According to the fourteenth implementation, since the urging member is provided for urging the lip pieces toward mutually opposite directions, even though the vacuum slide chamber has low pressure as a result of vacuum evacuation, the lip pieces can be reliably brought into contact with the slide surface and the cover, respectively, whereby high sealing performance can be implemented.

In accordance with a fifteenth implementation, a vacuum control device comprises a control unit for controlling a linear actuator according to the thirteenth implementation, wherein the control unit has a conductance adjustment mode for controlling the drive section such that a range of the moving member which is moved into the interior of the vacuum chamber in the course of reciprocation of the moving member by the drive section is moved within a range from the interior of the vacuum chamber to the interior of the vacuum slide chamber.

According to the fifteenth implementation, the control unit executes the conductance adjustment mode for controlling the drive section so as to move a range of the moving member which is moved into the interior of the vacuum chamber, within a range from the interior of the vacuum chamber to the interior of the vacuum slide chamber. Thus, in the conductance adjustment mode, a range of the cover which has been exposed to the exterior of the vacuum slide chamber is not moved into the interior of the vacuum chamber, whereby conveyance of gas into the vacuum chamber can be restrained. As a result, in the conductance adjustment mode, the interior of the vacuum chamber can be maintained at a higher vacuum level.

In accordance with a sixteenth implementation, in the vacuum control device according to the fifteenth implementation, the control unit has a desorption mode for, before start of the conductance adjustment mode, vacuum-evacuating the vacuum slide chamber through the vacuum evacuation channel for a predetermined period of time in a condition in which a range of the moving member having been moved from the interior of the vacuum chamber to the exterior of the vacuum slide chamber in the course of reciprocation of the moving member by the drive section is moved into the vacuum slide chamber.

According to the sixteenth implementation, the control unit executes, before start of the conductance adjustment mode, the desorption mode for vacuum-evacuating the vacuum slide chamber for a predetermined period of time in a condition in which a range of the moving member having been moved from the interior of the vacuum chamber to the exterior of the vacuum slide chamber is moved into the vacuum slide chamber. Thus, since the conductance adjustment mode is started in a condition in which gas is eliminated from the cover, conveyance of gas into the vacuum chamber can be restrained.

In accordance with a seventeenth implementation, in the linear actuator according to the first implementation, the drive section comprises a cylinder which is disposed externally of the vacuum chamber and into which working fluid flows, a piston disposed within the cylinder in such a manner as to define a working chamber, and being configured to be moved within the cylinder by pressure of the working fluid supplied into the working chamber, and an urging member being configured to urge the piston toward the vacuum chamber, and the moving member is connected to the piston.

According to the seventeenth implementation, since the piston generates load according to pressure of the working fluid, the linear actuator is suited for use in explosion proof environment and can generate a large drive force with a small size. Thus, there can be implemented a linear actuator suited for use in semiconductor manufacturing apparatus.

Another implementation is a computer program whose execution causes a control device to perform a control function of the vacuum control device. The computer program comprises a program whose execution causes the control device to perform the conductance adjustment mode.

Also, another implementation is, for example, a vacuum control method, or a medium that stores a program for performing the vacuum control method.

DETAILED DESCRIPTION OF EMBODIMENTS OF THE INVENTION

A first embodiment of the present invention will next be described with reference to the drawings. The first embodiment is an embodiment of a vacuum control valve 10 in which a valve body 33 is attached to a linear actuator A, as well as a vacuum control device for the vacuum control valve 10. Description below discusses the use of the vacuum control valve 10 with a semiconductor manufacturing apparatus which executes an etching process by means of plasma.

(Basic Configuration of Vacuum Control Valve)

Figure 1:
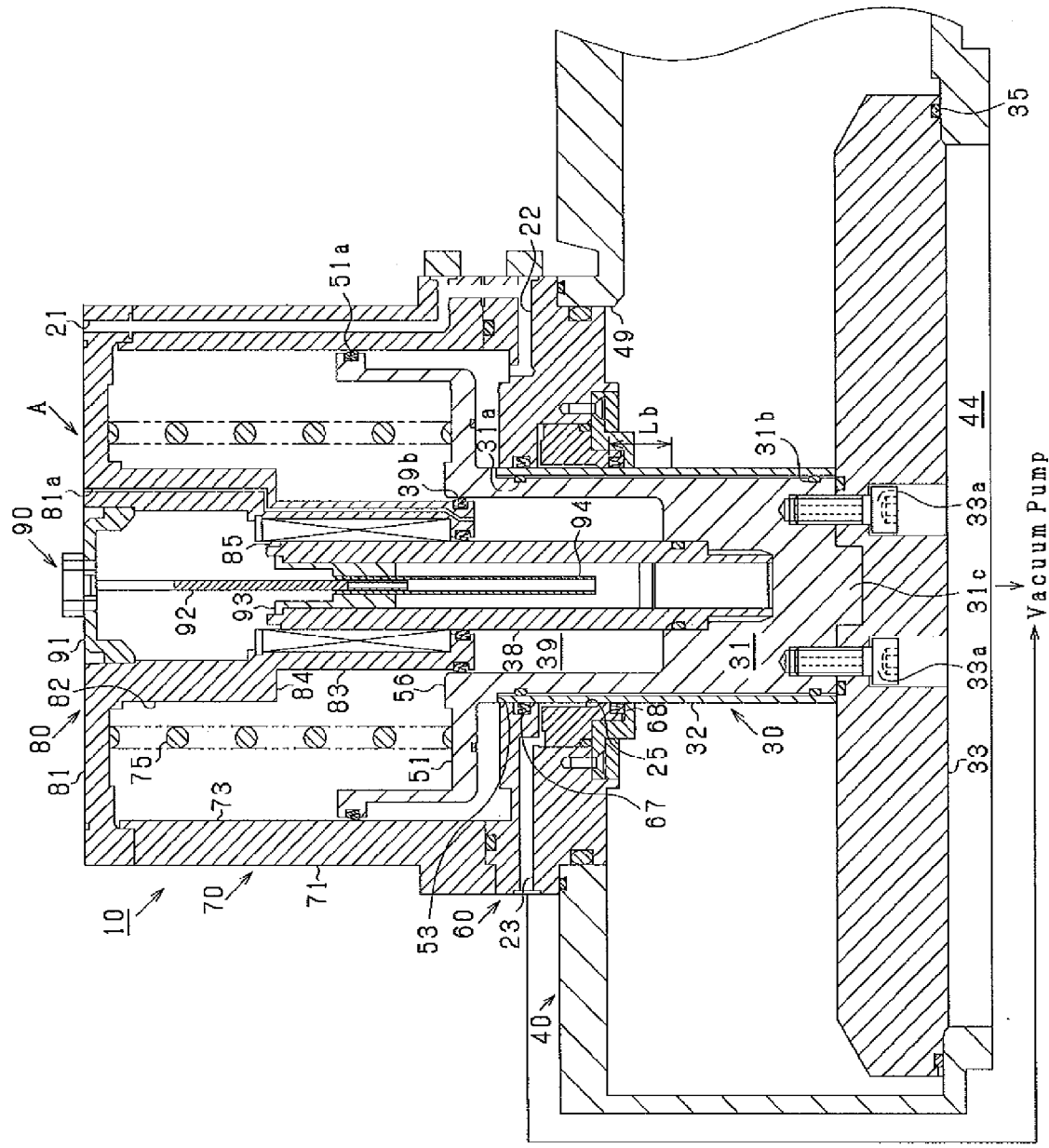
FIG. 1 Sectional view showing a vacuum control valve which is idle (fully closed) and to which a linear actuator according to a first embodiment of the present invention is applied.

As shown in FIG. 1, the semiconductor manufacturing apparatus includes a vacuum chamber 40 (vacuum container) for vacuum-processing a workpiece (not shown), such as a substrate, and plasma is generated within the vacuum chamber 40. The vacuum chamber 40 has an opening 49 for establishing communication between the interior and the exterior of the vacuum chamber 40. The vacuum control valve 10 is fitted to the opening 49. The vacuum control valve 10 is composed basically of the linear actuator A and the valve body 33, which is moved rectilinearly by the linear actuator A in the interior of the vacuum chamber 40. In the following description, the interior of the vacuum chamber 40 indicates a region located internally of the inner wall surface of the vacuum chamber 40. More specifically, the interior of the vacuum chamber 40 indicates an inside region of the vacuum chamber 40 located internally of a seal member 68, which will be described later. Also, the exterior of the vacuum chamber 40 indicates a region located externally of the inner wall surface of the vacuum chamber 40. More specifically, the exterior of the vacuum chamber 40 indicates an outside region of the vacuum chamber 40 located externally of the seal member 68.

The linear actuator A includes a drive section 70 located externally of the vacuum chamber 40, and an operating section 30 which is moved in the axial direction (vertical direction in FIG. 1) of the drive section 70. The linear actuator A includes a slide section (slide seal section) 60 which seals the opening 49 while allowing the operating section 30 to slide thereon, thereby maintaining a vacuum level in the interior of the vacuum chamber 40. The slide section 60 is provided between the vacuum chamber 40 and the drive section 70 and is attached to the opening 49.

The vacuum chamber 40 has a connective communication opening 45 (see FIG. 3) formed in a wall (lower wall in FIG. 1) opposite a wall in which the opening 49 is formed. The connective communication opening 45 forms a connection port 44, and a vacuum pump is connected to the connection port 44. The connective communication opening 45 has a rectangular shape elongated in one direction (horizontal direction in FIG. 1). A valve seat 43 on which the valve body 33 is seated is formed on an inner wall surface (upper surface of the lower wall in FIG. 1) of the vacuum chamber 40 where the connective communication opening 45 opens. The valve seat 43 is lower in surface roughness (higher in smoothness) than other portions of the vacuum chamber 40.

Figure 4:
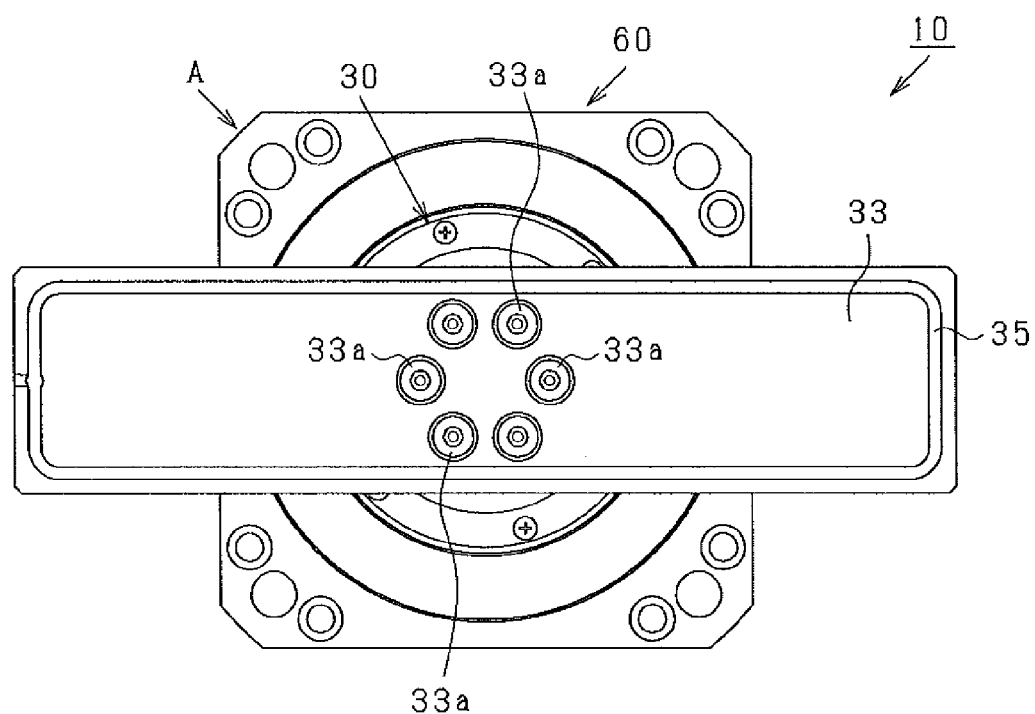
FIG. 4 Bottom view of the idle (fully closed) vacuum control valve as viewed from the end surface of a valve body.

A surface (hereinafter, called the lower surface) of the valve body 33 which faces the connective communication opening 45 has a rectangular shape larger in area than the connective communication opening 45. As a result of the valve body 33 being seated on the valve seat 43, the connective communication opening 45 is closed. As shown in FIG. 4, an O-ring 35 is fitted to the lower surface of the valve body 33 in such a manner as to protrude slightly toward the connective communication opening 45 (downward).

Figure 2:
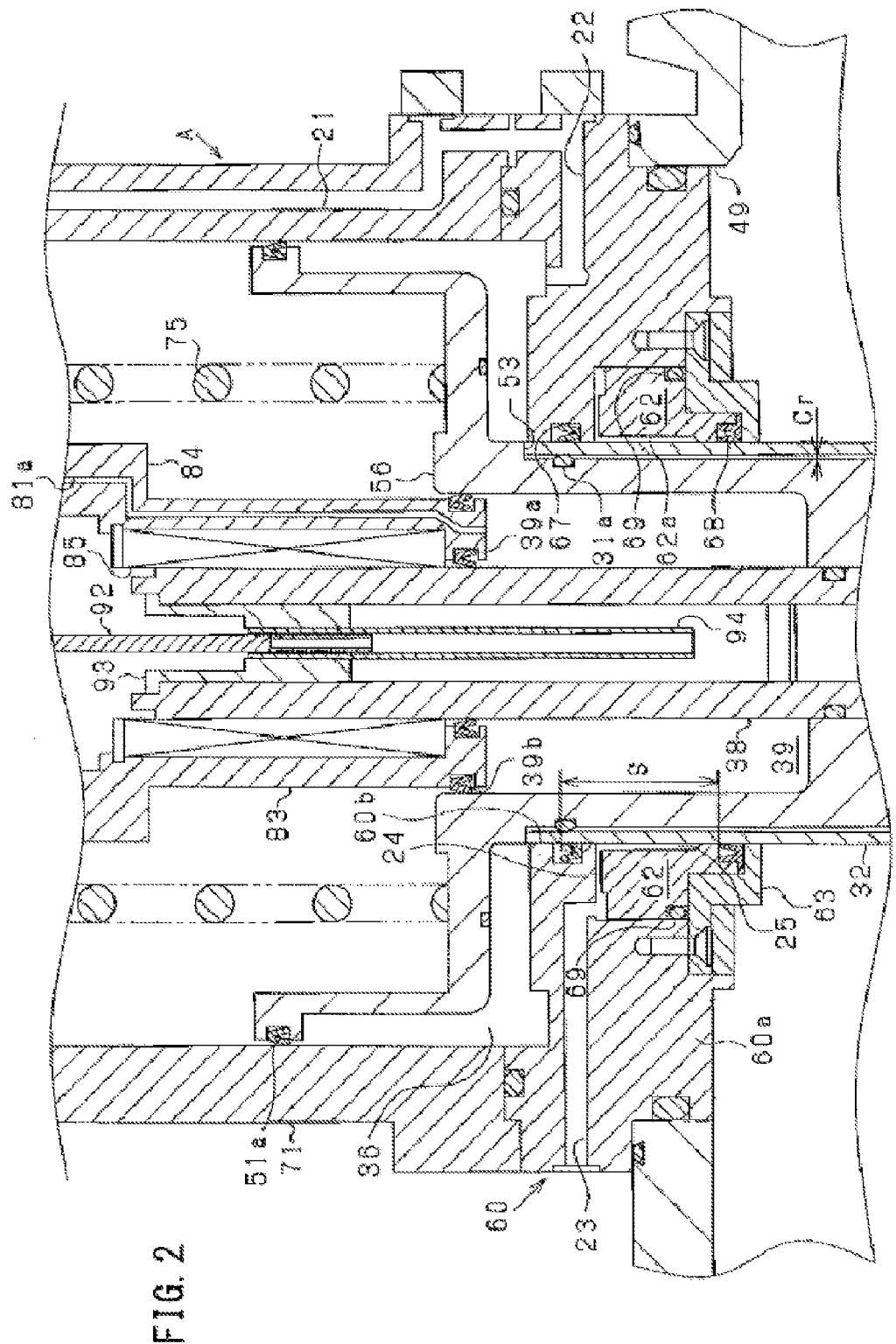
FIG. 2 Enlarged sectional view showing a slide section of the vacuum control valve.

The operating section 30 includes a columnar piston rod (moving member) 31 to which the valve body 33 is attached. The operating section 30 also includes a cylindrically shaped member (cover) 32 which covers an outer circumferential surface (outer surface) of the piston rod 31. The operating section 30 faces the interior of the vacuum chamber 40 through the opening 49 (specifically, a through hole provided in the slide section 60). The piston rod 31 has a circular columnar shape elongated in the moving direction of the piston rod 31. As shown in FIG. 2, the piston rod 31 has an annular positioning shoulder 53 protruding outward in radial directions thereof and formed at an end portion (upper end portion in FIG. 2) located toward the exterior of the vacuum chamber 40. One end of the cylindrically shaped member 32 is in contact with the positioning shoulder 53, whereby the cylindrically shaped member 32 is positioned.

The piston rod 31 has an attachment section 31c provided at an end portion (lower end portion in FIG. 1) located toward the interior of the vacuum chamber 40. A central portion of the attachment section 31c protrudes in the moving direction of the piston rod 31 (downward in FIG. 1). In the first embodiment, the piston rod 31 and the attachment section 31c are formed integrally from a metal material; specifically, aluminum. The valve body 33 is fixed to the piston rod 31 by use of a plurality of bolts 33a. The attachment section 31c and the piston rod 31 may be separate members.

The piston rod 31 has a cylindrical space formed therein and opening at an end surface located opposite the attachment section 31c. The cylindrical space forms a shutoff load generating chamber 39 for generating force to urge the piston rod 31 and the valve body 33 toward the valve seat 43 (see FIG. 2). The specific constitution of the cylindrically shaped member 32 will be described later.

The drive section 70 includes a cylinder tube (cylinder) 71 provided in the exterior of the vacuum chamber 40. The drive section 70 also includes a piston 51 which is provided within the cylinder tube 71 in such a manner as to be movable in the axial direction (vertical direction in FIG. 1). Furthermore, the drive section 70 includes an urging spring (urging member) 75 which urges the piston 51 toward the vacuum chamber 40 (downward in FIG. 1).

The cylinder tube 71 is disposed on a surface (upper surface in FIG. 1) of the slide section 60 which faces the exterior of the vacuum chamber 40. The cylinder tube 71 encloses the opening 49 from outside the vacuum chamber 40. An opening of the cylinder tube 71 located opposite the vacuum chamber 40 is closed with a head cover 81.

The piston 51 extends radially toward an inner circumferential surface 73 of the cylinder tube 71 from an end portion of the piston rod 31 located opposite the valve body 33 and further extends in the direction away from the vacuum chamber 40 (upward in FIG. 1) in the vicinity of the inner circumferential surface 73. That is, the piston 51 is formed integral with the piston rod 31 and has an annular shape which opens in the direction opposite the vacuum chamber 40 (upward in FIG. 1).

Figure 3:
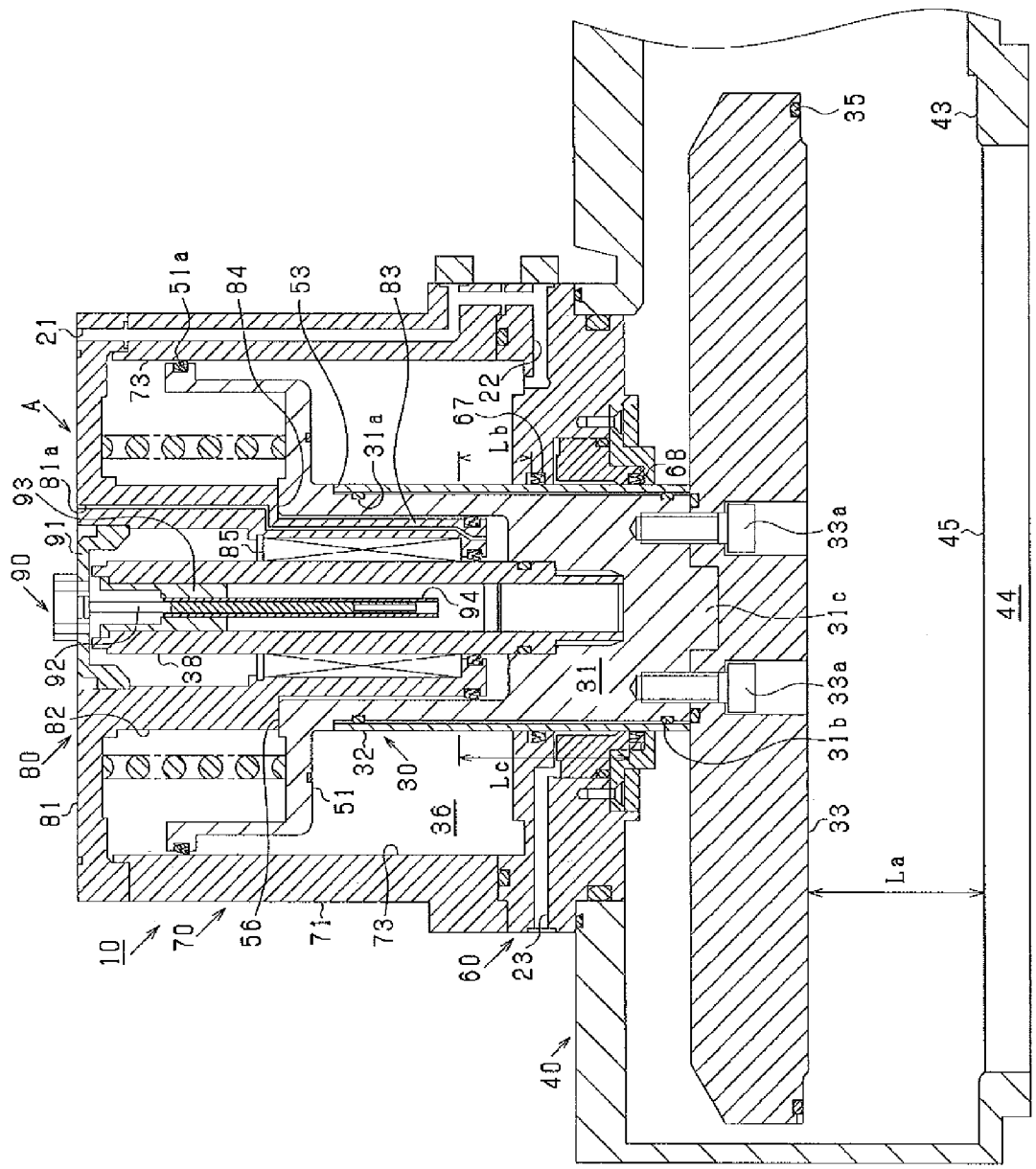
FIG. 3 Sectional view showing the fully opened vacuum control valve.

In a condition in which the piston 51 is disposed within the cylinder tube 71, the cylinder tube 71, the piston 51, the slide section 60, and the cylindrically shaped member 32 define a valve opening control chamber 36 (working chamber; see FIG. 3). Also, the piston 51 has an annular piston seal member 51a. The piston seal member 51a is provided on the outer circumferential surface of the piston 51 which faces the inner circumferential surface 73 of the cylinder tube 71, and protrudes outward in radial directions of the piston 51. The piston seal member 51a is elastically in contact with the inner circumferential surface 73 of the cylinder tube 71, thereby providing a seal between the outer circumferential surface of the piston 51 and the inner circumferential surface 73 of the cylinder tube 71. The piston seal member 51a and a V packing 67, which will be described later, seal hermetically the valve opening control chamber 36.

The valve opening chamber 36 is a doughnut-like (annular) enclosed space whose volume varies. The valve opening control chamber 36 communicates with an unillustrated air source through a valve-opening air channel 21 provided in the cylinder tube 71 and through a connection channel 22 provided in the slide section 60. Working air (working fluid) is supplied from the air source to the valve opening control chamber 36 through the valve-opening air channel 21 and through the connection channel 22. That is, supply of working air from the air source to the valve opening control chamber 36 increases the volume of the valve opening control chamber 36. As a result, the piston 51 is moved in the direction away from the vacuum chamber 40 (upward in FIG. 1). That is, pressure of working air supplied into the valve opening control chamber 36 acts to open the valve body 33.

The urging spring 75 is disposed within the cylinder tube 71 while being held between the head cover 81 and the piston 51. The urging spring 75 is in contact with the head cover 81 and with the piston 51. The urging spring 75 urges the piston 51 toward the vacuum chamber 40 (downward in FIG. 1) with its elastic force.

The head cover 81 includes a tubular portion 82 and a slide protrusion 83 which extend within the cylinder tube 71 in the moving direction of the operating section 30. The tubular portion 82 has a cylindrical shape which is coaxial with the operating section 30. The slide protrusion 83 is connected to an end portion (lower end portion in FIG. 1) of the tubular portion 82 located toward the vacuum chamber 40. The slide protrusion 83 has a cylindrical shape which is coaxial with the tubular portion 82. The outside diameter of the slide protrusion 83 is smaller than that of the tubular portion 82. A stroke limiting surface 84 is formed at the connection between the slide protrusion 83 and the tubular portion 82 and is oriented toward the vacuum chamber 40. The head cover 81 has a valve-closing air channel 81a formed therein such that the valve-closing air channel 81a extends through the walls of the tubular portion 82 and the slide protrusion 83 and communicates with the shutoff load generating chamber 39. The valve-closing air channel 81a is connected to an unillustrated air source, and working air (working fluid) is supplied from the air source to the shutoff load generating chamber 39 through the valve-closing air channel 81a.

As shown in FIG. 3, the stroke limiting surface 84 is provided at a position where the piston 51 can come into contact with the same. Through contact of the stroke limiting surface 84 with the piston 51, the amount of movement of the piston 51 is limited. That is, the stroke limiting surface 84 limits movement of the piston 51 in the direction (the upward direction in FIG. 1; hereinafter, referred to as the opening direction) in which a lift La increases. Meanwhile, contact between the valve body 33 and the valve seat 43 limits movement of the piston 51 in the direction (the downward direction in FIG. 1; hereinafter, referred to as the closing direction) in which the lift La reduces. A portion of the piston 51 which comes into contact with the stroke limiting surface 84 is called a stroke limiting end portion 56.

The slide protrusion 83 has an external shape which substantially coordinates with the shutoff load generating chamber 39. When the piston 51 moves in the opening direction, the slide protrusion 83 is accommodated in the shutoff load generating chamber 39 (see FIG. 3). A packing 39b having a V-shaped cross section is annularly fitted to the outer circumferential surface of the slide protrusion 83. The packing 39b is in contact with the inner circumferential surface of the shutoff load generating chamber 39, thereby providing a seal between the slide protrusion 83 and the inner circumferential surface of the shutoff load generating chamber 39 (see FIG. 2).

When working air is supplied into the shutoff load generating chamber 39, the volume of the shutoff load generating chamber 39 increases. As a result, the piston rod 31 is urged toward the connection port 44 (downward in FIG. 1). That is, pressure of working air supplied into the shutoff load generating chamber 39 acts on the valve body 33 in the closing direction. Thus, the shutoff load generating chamber 39 can supplement force with which the urging spring 75 urges the piston 51 in the closing direction. Accordingly, urging force required of the urging spring 75 can be reduced. As a result, a setting load (load required for shutoff) of the urging spring 75 in the course of manufacture can be reduced, whereby manufacturability of the vacuum control valve 10 can be improved. A second packing 39a is annularly provided on the inner circumferential surface of the slide protrusion 83 at a position located internally of the packing 39b. The second packing 39a is in contact with a guide rod 38, which will be described later, thereby providing a seal between the slide protrusion 83 and the guide rod 38 (see FIG. 2).

A linear bearing (guide) 85 is provided on the inside of the slide protrusion 83. The first embodiment employs a linear bush as the linear bearing 85. The guide rod 38 connected to the piston rod 31 is slidably inserted into the linear bearing 85. The guide rod 38 has a cylindrical shape extending in the moving direction of the piston rod 31 along the axis of the piston rod 31. By virtue of the linear bearing 85 guiding the guide rod 38, while the relation of radial (horizontal in FIG. 1) relative positions is maintained intact among the piston rod 31 (operating section 30), the drive section 70, and the slide section 60, the piston rod 31 can be smoothly reciprocated.

A valve body position sensor 90 is provided on the head cover 81. The valve body position sensor 90 includes a probe 92 extending within the cylinder tube 71 in the moving direction of the piston rod 31. The valve body position sensor 90 also includes an insertion pipe 94 into which one end portion (lower end portion in FIG. 1) of the probe 92 is inserted. The other end portion (upper end portion in FIG. 1) of the probe 92 is fixed to a probe attachment member 91 which closes the opening of the tubular portion 82. The insertion pipe 94 is fixed within the guide rod 38 through an insertion pipe attachment member 93 provided within the guide rod 38. The valve body position sensor 90 generates an electric signal in response to the amount of insertion of the probe 92 into the insertion pipe 94. That is, by means of the valve body position sensor 90 measuring the amount of movement of the piston rod 31, the lift La of the valve body 33 can be obtained. A specific example of the valve body position sensor 90 is LINEAR PULSE CODER (registered trademark).

Figure 5:
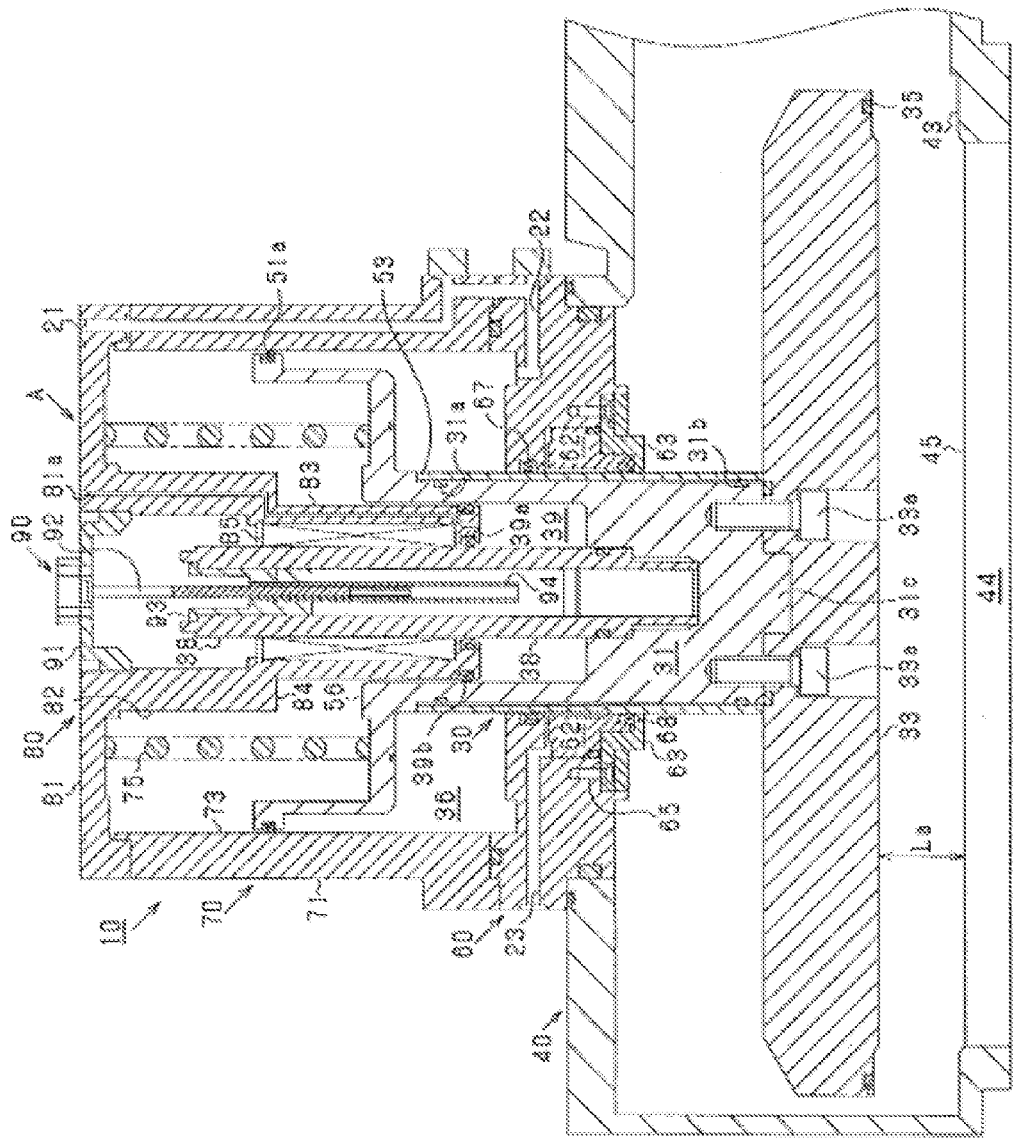
FIG. 5 Sectional view of the vacuum control valve in a condition of controlling vacuum pressure.

The vacuum control valve 10 has, as shown in FIG. 1, a shutoff function (the lift La is zero) for shutting off communication between the connection port 44 and the interior of the vacuum chamber 40 (when it is not operated) and has, as shown in FIG. 5, a conductance adjusting function (the lift La varies) for controlling conductance of the vacuum control valve 10 (when it is operated). Conductance means flowability of gas within the vacuum chamber 40 through the vacuum control valve 10. That is, the conductance adjusting function is performed by operating the vacuum control valve 10 while using, as valve opening, the lift (the amount of movement of the moving member) La, which is the distance between the valve body 33 and the valve seat 43.

Meanwhile, as shown in FIG. 1, the shutoff function is performed by closing the connective communication opening 45 (fully closed condition) through establishment of contact between the valve body 33 and the valve seat 43 within the vacuum chamber 40. A seal at the time of shutoff is provided by means of the O-ring 35 of the valve body 33 coming into contact with the valve seat 43 and being deformed. As shown in FIG. 3, the vacuum control valve 10 allows the valve body 33 to move rectilinearly until establishment of a fully opened condition (the lift La is maximized) in which the valve body 33 is in the proximity of the slide section 60.

(Mechanism of Adsorptive Conveyance and Sealing Structure of Vacuum Control Valve)

Next, there will be described the mechanism of adsorptive conveyance of working air (working fluid) which causes deterioration in vacuum level within the vacuum chamber 40. Working air is gas which predominantly contains nitrogen and oxygen. Therefore, in the case where no measure is taken for the operating section 30, when a portion of the operating section 30 faces the interior of the valve opening control chamber 36 (see FIG. 3), gas molecules of working air are adsorbed (e.g., physically or chemically) on the portion of the operating section 30. Then, as shown in FIG. 1, when the portion of the operating section 30 which has faced the valve opening control chamber 36 moves into the vacuum chamber 40, the gas molecules adsorbed on the operating section 30 are released (desorbed) in the interior of the vacuum chamber 40.

A range of the operating section 30 which faces both of the interior of the vacuum chamber 40 and the interior of the valve opening control chamber 36 is defined as a first slide range (a range of the moving section which faces both of the interior of the vacuum chamber and the exterior of the vacuum chamber as well as the exterior of the vacuum slide chamber) Lb (see FIGS. 1 and 3). That is, the first slide range Lb is a range of the operating section 30 which is exposed to both of the valve opening control chamber 36 and the vacuum chamber 40 when the lift La is controlled so as to bring the valve body 33 to a fully closed condition and to a fully opened condition (when the moving member is maximally reciprocated).

Thus, if the cylindrically shaped member 32 is not provided, the first slide range Lb will cause adsorption of working air in the valve opening control chamber 36 and release of working air in the vacuum chamber 40 when the operating section 30 is reciprocated so as to bring the valve body 33 to a fully opened condition and to a fully closed condition. Conveyance of working air from the valve opening control chamber 36 to the vacuum chamber 40 deteriorates vacuum level (increases pressure) within the vacuum chamber 40.

In view of the above problem, the inventors of the present invention have devised a technique for restraining conveyance of working air from the valve opening control chamber 36 to the vacuum chamber 40 by means of the piston rod 31 being covered with the cylindrically shaped member 32 having low adsorption. In the first embodiment, the cylindrically shaped member 32 covers the outer side wall surface of the piston rod 31 along substantially the overall longitudinal length (substantially the overall vertical length in FIG. 1) of the outer side wall surface. That is, the axial dimension of the cylindrically shaped member 32 substantially coincides with the dimension of the piston rod 31 between the positioning shoulder 53 and the end (lower end in FIG. 1) located opposite the positioning shoulder 53. In a condition before attachment of the valve body 33 to the piston rod 31, the cylindrically shaped member 32 is externally fitted to the piston rod 31 from the attachment section 31c. In this condition, the valve body 33 is fixed to the attachment section 31c, whereby the cylindrically shaped member 32 is attached to the piston rod 31. At this time, the cylindrically shaped member 32 is held, at its longitudinally opposite ends, between the positioning shoulder 53 and the valve body 33. Thus, the cylindrically shaped member 32 is fixed to the piston rod 31 without play in the axial direction.

The cylindrically shaped member 32 is formed of a sintered body (ceramic) formed through firing of aluminum oxide (alumina). By virtue of high density of a sintered body, surface roughness of the cylindrically shaped member 32 is restrained, thereby implementing low adsorption of gas molecules on the cylindrically shaped member 32. As a result, the cylindrically shaped member 32 is smaller in the amount of gas adsorption per unit area than the outer surface of the piston rod 31.

The inventors of the present invention have confirmed that the cylindrically shaped member 32 formed of a sintered body is smaller in the amount of adsorption of working air even as compared with, for example, the case where pore-filling is performed on an anode oxidation film formed on an aluminum piston rod. Also, by virtue of high electrical insulation of a sintered body, the cylindrically shaped member 32 has plasma resistance. Since the attachment section 31c adapted to attach the valve body 33 to the piston rod 31 resides within the vacuum chamber 40 at all times, the attachment section 31c is free from adsorption of working air resulting from exposure to the exterior of the vacuum chamber 40. Thus, in contrast to the cylindrically shaped member 32, the attachment section 31c is not required to have low adsorption; thus, the outer surface of the attachment section 31c is higher in adsorption than the cylindrically shaped member 32. Preferably, ceramic of dense alumina having a relative density of 95% or more is used as a sintered body used to form the cylindrically shaped member 32. However, a sintered body is rather effective, so long as its relative density is 90% or more. A sintered body having a high relative density of, for example, 96%, 97%, or 98% may be employed according to required vacuum level. Furthermore, by use of ceramic of high-purity alumina having a relative density of 99% or more, the amount of conveyance of working air can be restrained to the smallest possible level.

Furthermore, by means of the surface of ceramic of dense alumina being mirror-finished to an average surface roughness of 0.2 or less (0.2Ra), adsorption on the cylindrically shaped member 32 can be further reduced. Also, a high seal is secured, and friction between the cylindrically shaped member 32 and the V packing 67 or the seal member 68, which will be described later, can be reduced. Reduction of friction can contribute to low hysteresis of the vacuum control valve 10. The average surface roughness is set as appropriate to 0.1, 0.3, 0.4, or 0.5 according to specifications of the vacuum control valve 10.

As shown in FIG. 2, the cylindrically shaped member 32 is attached to the outer surface of the piston rod 31 with a gap Cr formed therebetween. The gap Cr is sealed by a pair of elastic seal members; i.e., O-rings 31a and 31b, provided around the piston rod 31. The O-rings 31a and 31b are elastic members provided away from each other in the moving direction of the piston rod 31. The O-rings 31a and 31b are elastically in contact with the inner circumferential surface of the cylindrically shaped member 32, thereby sealing the gap Cr.

Thus, although the cylindrically shaped member 32 and the piston rod 31 differ in thermal expansion, the O-rings 31a and 31b elastically deform, thereby absorbing the difference in thermal expansion. As a result, the degree of freedom can be increased for selection of materials for the cylindrically shaped member 32 and the piston rod 31. For example, a metal material having excellent strength and toughness (e.g., aluminum) can be employed as material for the piston rod 31, whereas a sintered body of aluminum oxide having excellent electrical insulation can be selected as material for the cylindrically shaped member 32.

As mentioned above, through employment of the operating section 30 of dual structure composed of the piston rod 31 formed of metal material having excellent strength and toughness and the cylindrically shaped member 32 having low adsorption, there is implemented the poppet-type vacuum control valve 10 (linear actuator A) that can be used with the vacuum chamber 40 which handles plasma. As a result, a low flow rate (a very low flow rate) of etching gas can be implemented in the vacuum chamber 40 in which plasma is generated.

FIG. 5 is a sectional view of the vacuum control valve 10 in a condition of controlling vacuum pressure (in a condition of adjusting conductance). In spite of using the aforementioned cylindrically shaped member 32 having low adsorption, working air may be adsorbed in a slight amount on the cylindrically shaped member 32. Thus, in controlling conductance, slight leakage into (deterioration in vacuum level in) the vacuum chamber 40 may occur, potentially resulting in a failure to maintain high vacuum. In order to restrain the slight leakage, the vacuum control valve 10 has a vacuum evacuation function in the slide section 60.

As shown in FIG. 2, the slide section 60 includes a slide section body 60a and a slide surface 60b. The slide section body 60a is provided on the vacuum chamber 40 in such a manner as to close the opening 49. The slide surface 60b is formed through provision, in the slide section body 60a, of a through hole which opens in the moving direction of the piston rod 31. The cylindrically shaped member 32 slides on the slide surface 60b. The V packing (second slide seal member) 67 and the seal member (first slide seal member) 68 are provided on the slide surface 60b while being away from each other in the moving direction of the piston rod 31. The V packing 67 and the seal member 68 define a vacuum slide chamber S between the slide surface 60b and the cylindrically shaped member 32.

The slide section body 60a includes a vacuum evacuation region formation member 62 located between the V packing 67 and the seal member 68, and a support member 63 which supports the vacuum evacuation region formation member 62 from inside the vacuum chamber 40 (from lower side in FIG. 1). The vacuum evacuation region formation member 62 is an annular member formed of aluminum and surrounds the cylindrically shaped member 32. The vacuum evacuation region formation member 62 has an annular recess 62a for defining a vacuum slide channel 25, which is a small gap between the same and the cylindrically shaped member 32.

The vacuum slide channel 25 is connected to an annular connection channel 24 which is defined between the vacuum evacuation region formation member 62 and the slide section body 60a and extends in radial directions of the slide section 60. The connection channel 24 is connected to a vacuum evacuation channel 23. The vacuum evacuation channel 23 extends radially within the slide section body 60a and opens at the outer surface of the slide section body 60a. The vacuum evacuation channel 23 is connected to the aforementioned vacuum pump. That is, the vacuum slide chamber S communicates with the vacuum pump through the vacuum slide channel 25, the connection channel 24, and the vacuum evacuation channel 23.

As shown in FIG. 2, the V packing 67 has a V-shaped cross section which opens toward the exterior of the vacuum chamber 40 (upward in FIG. 1). The V packing 67 is in contact with the outer surface of the cylindrically shaped member 32 along the overall circumference, thereby providing a seal between the vacuum slide chamber S and the valve opening control chamber 36 (the exterior of the vacuum chamber 40 as well as the exterior of the vacuum slide chamber S). Pressure of working air in the valve opening control chamber 36 urges the V packing 67 in a fanning-out direction, thereby increasing sealing capability.

Figure 6:
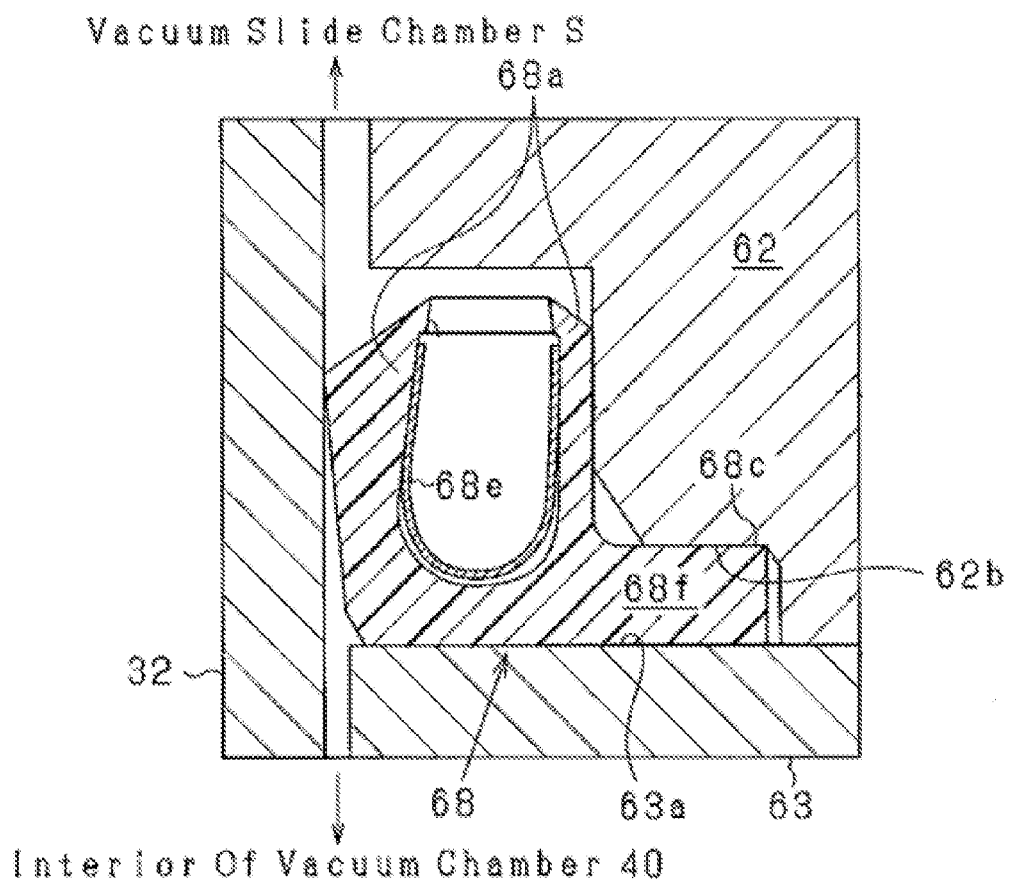
FIG. 6 Sectional view showing, on an enlarged scale, a seal member.

FIG. 6 is a sectional view showing, on an enlarged scale, the seal member 68. The seal member 68 is in contact with the outer surface of the cylindrically shaped member 32 along the overall circumference, thereby providing a seal between the vacuum slide chamber S and the interior of the vacuum chamber 40. The seal member 68 is composed basically of Roto VL Seal (registered trademark) 68f and a metal spring (urging member) 68e. The Roto VL Seal (elastic member) 68f has a forked seal lip (lip) 68a. Lip pieces of the forked seal lip 68a are in contact with the slide surface 60b and the cylindrically shaped member 32, respectively. The Roto VL Seal 68f is constructed as follows: as pressure of the vacuum slide chamber S increases, the seal lip 68a expands such that its lip pieces move away from each other, thereby enhancing sealing capability.

The Roto VL Seal 68f has a heel flange 68c. The heel flange 68c is held between an inner surface 63a of the support member 63 and an inner surface 62b of the vacuum evacuation region formation member 62. The metal spring 68e is provided between lip pieces of the seal lip 68a in an elastically deformed condition and urges the lip pieces of the seal lip 68a in directions away from each other. Therefore, even in a condition in which the vacuum slide chamber S is subjected to vacuum evacuation, the seal member 68 maintains high sealing capability by virtue of elastic force of the metal spring 68e. The heel flange 68c, together with an O-ring 69 provided in the vacuum evacuation region formation member 62, provides a seal between the vacuum chamber 40 and the vacuum evacuation channel 23 (see FIG. 2).

By virtue of the sealing structure of the slide section 60, as a result of the vacuum slide chamber S being vacuum-evacuated, as will be described below, adsorption of working air on the cylindrically shaped member 32 can be restrained. Although, as mentioned above, adsorption on the cylindrically shaped member 32 is low, working air may be adsorbed in a slight amount on a portion of the cylindrically shaped member 32 which faces the valve opening control chamber 36. Working air adsorbed in a slight amount on the cylindrically shaped member 32 is desorbed from the cylindrically shaped member 32 in the vacuum slide chamber S.

However, since the vacuum slide chamber S is vacuum-evacuated by a vacuum pump, working air released into the vacuum slide chamber S is discharged to the exterior of the vacuum chamber 40 through the vacuum slide channel 25, the connection channel 24, and the vacuum evacuation channel 23. Thus, accumulation of working air in the vacuum slide chamber S is restrained. That is, it can be favorably restrained that working air released into the vacuum slide chamber S is adsorbed again on the cylindrically shaped member 32 and is then conveyed into the vacuum chamber 40. By virtue of this, deterioration in vacuum level within the vacuum chamber 40 is restrained, whereby a highly vacuum condition (e.g., high vacuum) can be maintained within the vacuum chamber 40.

Furthermore, since vacuum evacuation of the vacuum slide chamber S can remove dust adhering to the cylindrically shaped member 32, entry of foreign matter into the vacuum chamber 40 can be restrained.

In a certain constitution, a channel is formed in the slide surface 60b of the slide section 60; however, the channel is an inspection channel which is connected to a leakage inspection port (not shown) and used at the time of setup, or a suction channel for preventing outward leakage of poisonous gas from the vacuum chamber 40. The inspection channel is utilized for detecting leakage by use of helium gas. Specifically, at the time of set up, the inspection channel is used as follows: helium gas is discharged in the vicinity of the leakage inspection port, and leakage to the slide section is determined by checking to see if helium gas reaches the vacuum chamber 40. The suction channel is a port for sucking poisonous gas.

Therefore, the constitution of the present embodiment differs essentially from the above-mentioned constitutions in usage as well as the shape of the vacuum slide chamber S. Furthermore, the vacuum slide chamber S assumes the form of a tubular space extending along a predetermined length in the operating direction of the piston rod 31 (between the V packing 67 and the seal member 68). The tubular space includes the vacuum slide channel 25 formed at its central portion with respect to its length direction. Such a tubular space does not coordinate with the above-mentioned constitutions and is thus contradictory to the common technical practice of those skilled in the art at the time of application of the present invention.

Figure 7:
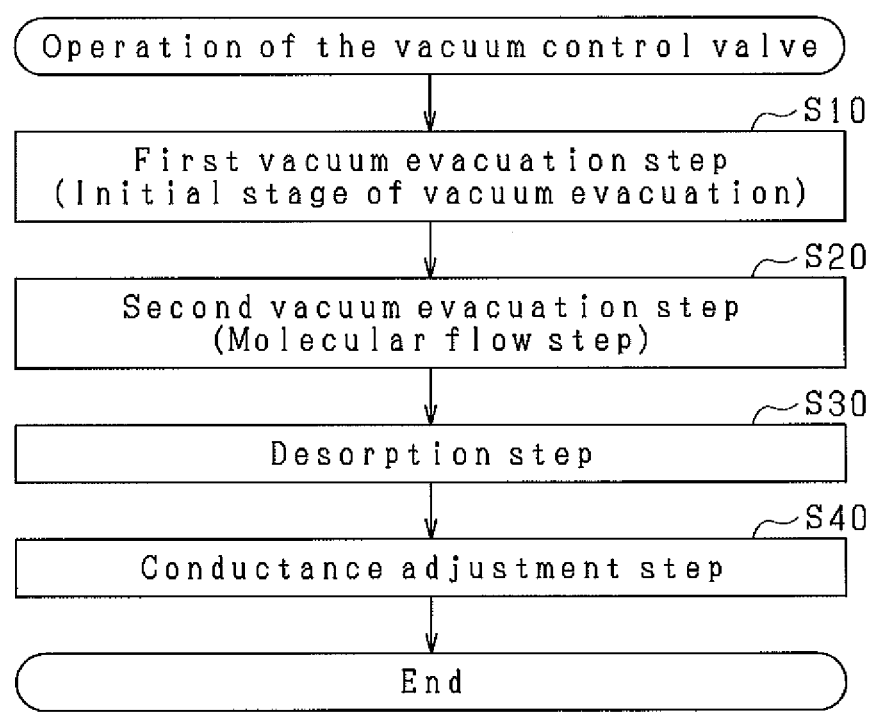
FIG. 7 Flowchart showing an example operation of the vacuum control valve.

FIG. 7 is a flowchart showing an example operation of the vacuum control valve 10. In step S10, a first vacuum evacuation step is performed. The first vacuum evacuation step is a step, in the initial stage of vacuum evacuation, of discharging gas at a low speed (slow discharge step) through control of the amount of deformation of the O-ring 35 (see FIGS. 1 and 3) provided on the valve body 33. The slow discharge step is proposed by one of the inventors of the present invention and is performed for preventing particles within the vacuum chamber 40 from being blown up (Japanese Patent Application Laid-Open (kokai) No. 2000-163137).

In step S20, a second vacuum evacuation step is performed. The second vacuum evacuation step is a step in the end stage of vacuum evacuation for smoothly performing discharge in the form of a molecular flow, which is a flow according to a probabilistic theory, in a condition in which the valve body 33 is fully opened (see FIG. 3). Discharge in the form of a molecular flow generally takes time; thus, desirably, the product of the lift La and the perimetric length of the valve body 33 (area) is increased for reducing discharge time.

In step S30, a desorption step (desorption mode) is performed. In the desorption step, the first slide range Lb of the cylindrically shaped member 32 is caused to stay in the vacuum slide chamber S for a predetermined period of time. That is, in the desorption mode, the first slide range Lb of the piston rod 31 which faces the exterior of the vacuum slide chamber S from the interior of the vacuum chamber 40 is moved into the vacuum slide chamber S. In this condition, the vacuum slide chamber S is vacuum-evacuated for a predetermined period of time through the vacuum evacuation channel 23. Thus, working air adsorbed in the first slide range Lb of the cylindrically shaped member 32 can be desorbed. The desorption step is performed in the case where a higher vacuum level (e.g., high vacuum) is required. A period of time for which the first slide range Lb stays in the vacuum slide chamber S is determined as appropriate according to, for example, a required vacuum level of the vacuum chamber 40.

The present step is preferably performed in the case of controlling the lift La to such an extent that there arises a region of the cylindrically shaped member 32 which faces both of the interior of the vacuum chamber 40 and the exterior of the vacuum slide chamber S (the exterior of the vacuum chamber 40) (i.e., the first slide range Lb). Also, in order to shorten a period of time for which the cylindrically shaped member 32 is in halt, a heater for accelerating desorption may be provided within the piston rod 31.

In step S40, a conductance adjustment step is performed. The conductance adjustment step is a step of controlling a vacuum level within the vacuum chamber 40 while etching gas is allowed to flow. In the conductance adjustment step, vacuum control is performed such that the first slide range Lb is not exposed to the interior of the vacuum chamber 40 (conductance adjustment mode). That is, in the conductance adjustment mode, in the course of reciprocation of the piston rod 31 by the drive section 70, a range of the piston rod 31 which faces the interior of the vacuum chamber 40 is moved within a range from the interior of the vacuum chamber 40 to the interior of the vacuum slide chamber S. In this case, a second slide range Lc (see FIG. 3) which can move from the interior of the vacuum chamber 40 to the exterior of the vacuum chamber 40 (to the vacuum slide chamber S or the valve opening control chamber 36) is set short, the interior and the exterior of the vacuum chamber 40 being separated by the seal member 68.

Conductance can be adjusted as needed for a small flow rate which is established by reducing the lift La to such an extent that the O-ring 35 of the valve body 33 comes into contact with the valve seat 43. Thus, stepless vacuum control can be performed in a wide pressure range from shutoff to a viscous flow or a molecular flow while there is prevented leakage of working air into the vacuum chamber 40, which serves as a vacuum channel.

The present embodiment described above in detail has the following advantages.

(1) The vacuum control valve 10 of the present embodiment has a shutoff function and can control vacuum from the initial stage of vacuum evacuation to a high vacuum region for the vacuum chamber 40 which handles plasma.

(2) The vacuum control valve 10 is a poppet-type vacuum control valve and thus can cope with a low flow rate (slow flow region) of etching gas through utilization of characteristics of the poppet-type vacuum control valve.

(3) The outer surface of the cylindrically shaped member 32 is smaller in the amount of adsorption of gas per unit area than the outer surface of the piston rod 31. Therefore, gas is unlikely to adhere to the cylindrically shaped member 32, thereby favorably restraining conveyance into the vacuum chamber 40 of gas adhering to the cylindrically shaped member 32.

(4) Since the attachment section 31c is formed of a metal material; specifically, aluminum, costs of material and machining can be reduced as compared with the case of employment of a sintered body as in the case of the cylindrically shaped member 32.

(5) Since the linear bearing 85 guides the guide rod 38, the piston rod 31 can be moved stably. Therefore, there is no need to provide, in the slide section 60, a guide mechanism for the cylindrically shaped member 32; thus, a seal in the slide section 60 can be secured.

(Another Embodiment)

The present embodiment is not limited to the above embodiment, but may be embodied, for example, as follows. Like members of the above embodiment and the present embodiment are denoted by like reference numerals, and repeated description thereof is omitted.

(1) The first embodiment is described while referring to the vacuum control valve 10 in which the valve body 33 is attached to the linear actuator A for controlling vacuum level within the vacuum chamber 40. However, no particular limitation is imposed on the linear actuator, so long as the linear actuator is used with the vacuum chamber 40 in which plasma is used.

Figure 8:
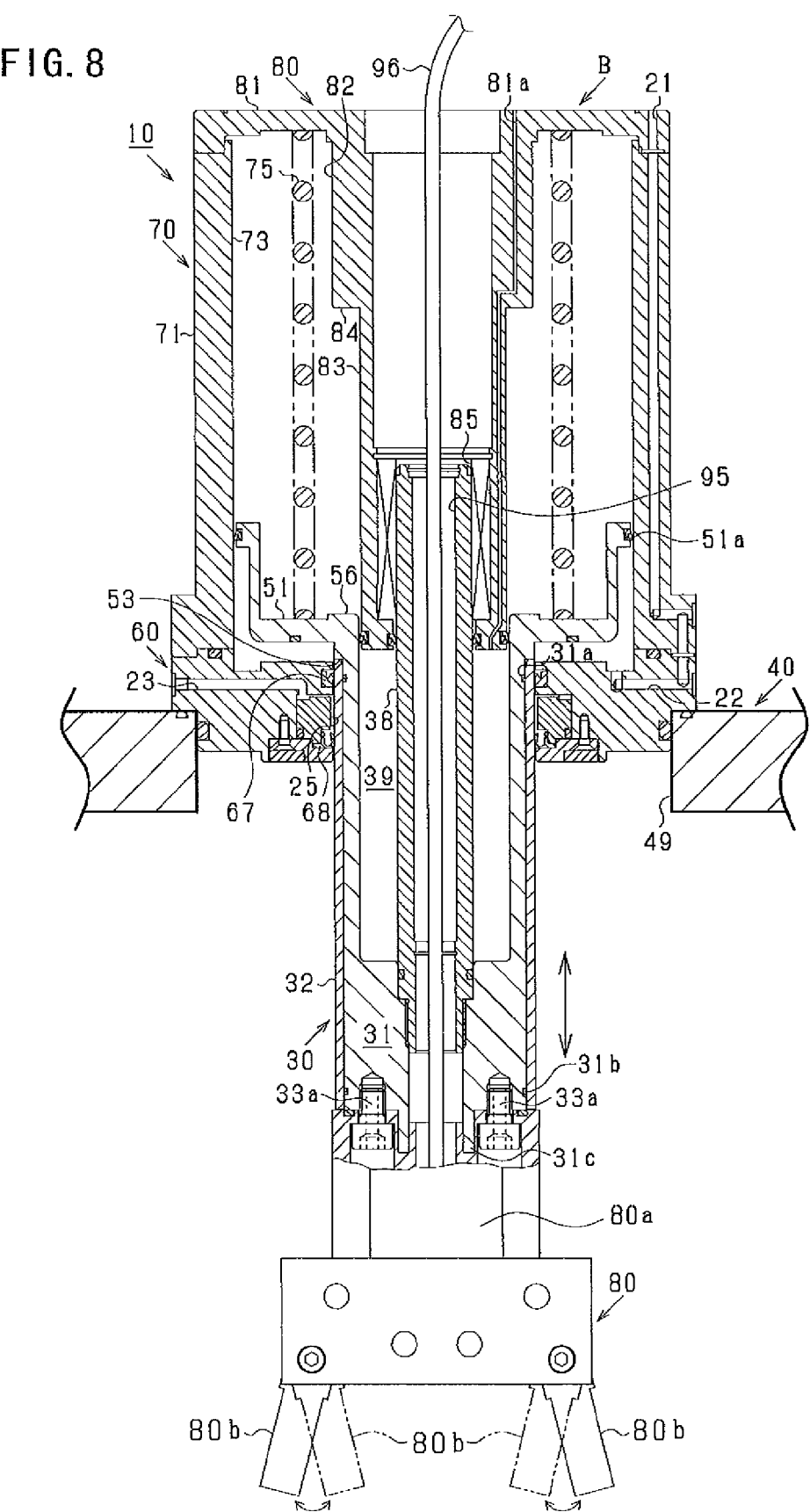
FIG. 8 Sectional view showing a linear actuator in operation according to a second embodiment of the present invention.
Figure 9:
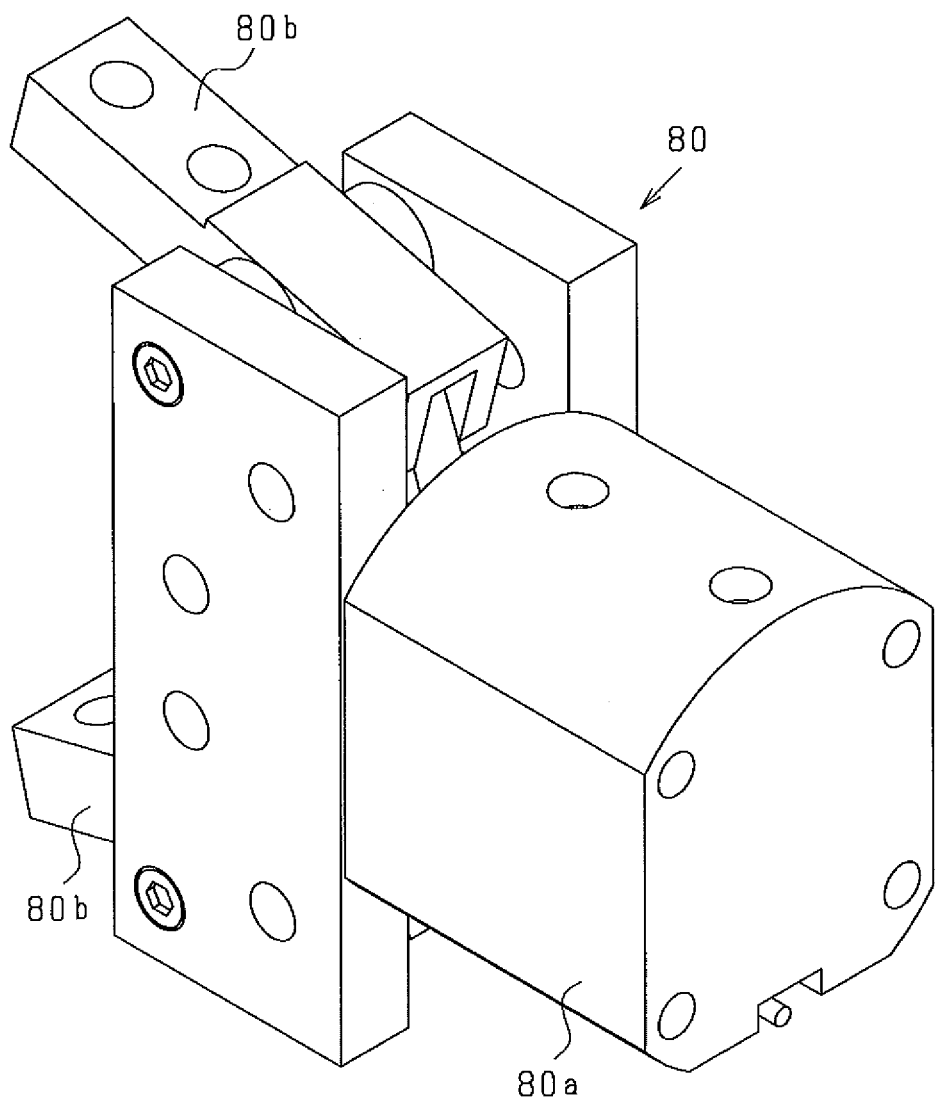
FIG. 9 Perspective view showing an arm.

For example, as shown in FIG. 8, according to a second embodiment of the present invention, a linear actuator B rectilinearly (vertically in FIG. 8) moves an arm (operation member) 80 which can work within the vacuum chamber 40. As shown in FIG. 9, the arm 80 handles workpieces (not shown), such as substrates, to be etched within the vacuum chamber 40. The arm 80 is composed of an arm body 80a and a pair of arm pieces 80b attached pivotably (in an opening adjustable manner) to the arm body 80a and handles a workpiece by use of the two arm pieces 80b.

The linear actuator B according to the second embodiment has an insertion passage 95 which extends through the guide rod 38, the piston rod 31 and the attachment section 31c in the moving direction of the piston rod 31. The probe attachment section 91 provided in the first embodiment is not attached to the head cover 81. One end of the insertion passage 95 opens to the atmosphere in the exterior of the vacuum chamber 40 (the exterior of the cylinder tube 71). Meanwhile, the other end of the insertion passage 95 faces the arm 80. That is, the insertion passage 95 provides communication between the arm 80 and the exterior of the vacuum chamber 40 while the vacuum chamber 40 is sealed.

A control line 96 extending from a drive source (not shown) for driving the arm 80 is inserted through the insertion passage 95 and connected to the arm body 80a of the arm 80. Specifically, in the case where the arm 80 is of a pneumatic type and is driven by air pressure, the control line 96 is composed of, for example, a pair of air tubes, one for air supply and the other for air discharge. In the case where the arm 80 is electrically powered and driven, the control line 96 is composed of, for example, a power line for supplying electric power and a control line for controlling the arm 80. A specific example of the control line is a line extending outward from a position sensor for detecting the positions of the arm pieces 80b.

Even in the case of an embodiment of the linear actuator B for rectilinearly moving the arm 80, similar to the case of the first embodiment, conveyance of gas into the vacuum chamber 40 can be restrained, whereby a high vacuum level can be maintained within the vacuum chamber 40. Also, through provision of the insertion passage 95 in the linear actuator B, the control line 96 can be connected to the arm 80 without involvement of deterioration in vacuum level within the vacuum chamber 40.

Figure 10:
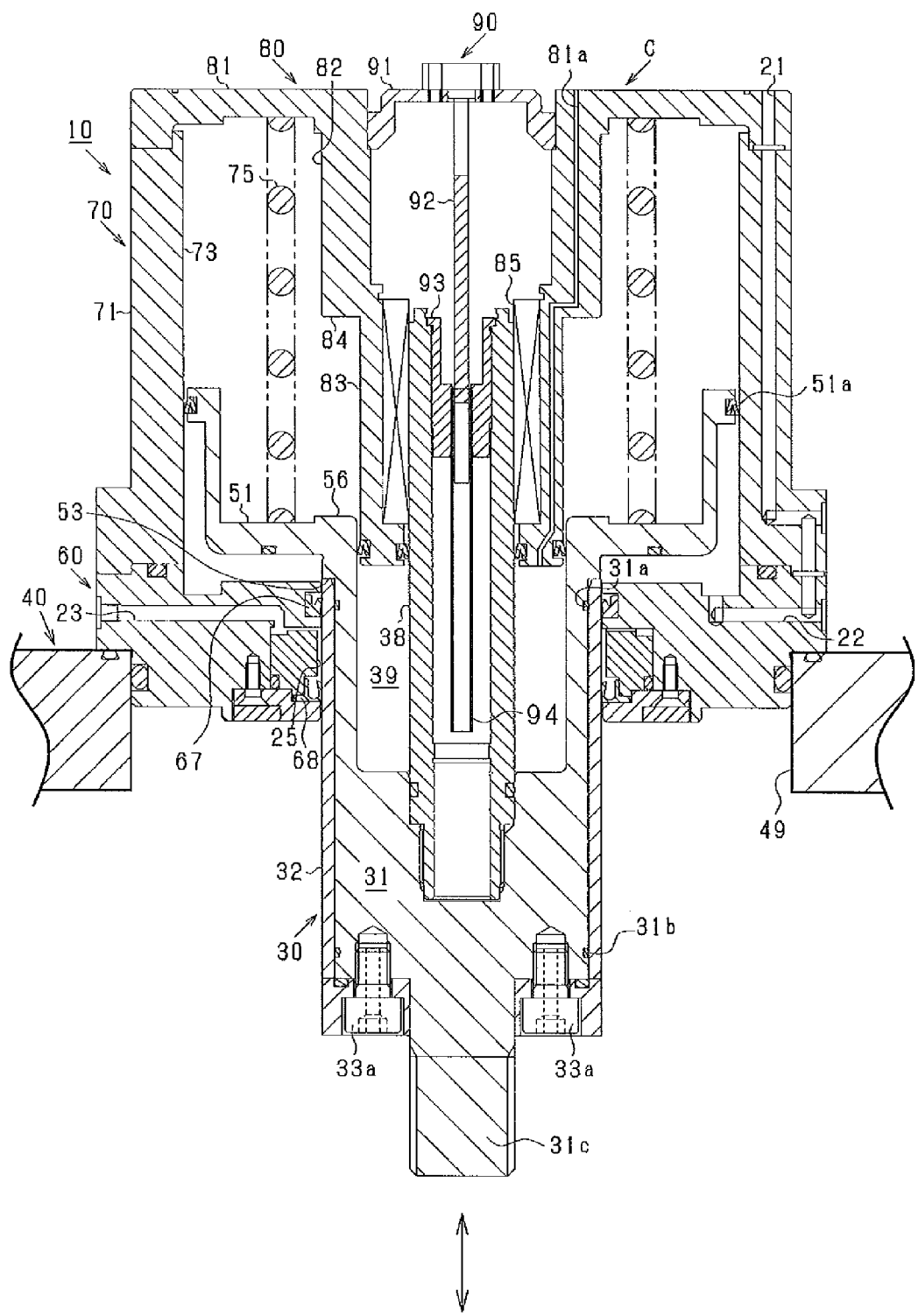
FIG. 10 Sectional view showing a linear actuator in operation according to a modified embodiment of the present invention.

In the case where the aforementioned workpiece position is merely moved rectilinearly, there is no need to attach the arm 80 to the attachment section 31c of the linear actuator B. That is, as in the case of a linear actuator C shown in FIG. 10, the attachment section 31c of the rectilinearly moving piston rod 31 may press a workpiece for moving the workpiece. In this case, since an end portion (the attachment section 31c, the bolts 33a, etc.) of the operating section 30 is exposed to plasma, electrical insulation must be provided for the end portion.

Thus, surface oxidization is performed on an end portion of the operating section 30 of the linear actuator C. Specifically, alumite treatment is performed as surface oxidization. As a result, the end portion of the operating section 30 becomes unlikely to be affected by plasma. The linear actuator C may be configured as follows: the attachment section 31c having an axial protrusion is replaced with a flat (planar) attachment section formed at an end portion of the piston rod 31, and the flat attachment section moves a workpiece.

(2) Examples of an article to be rectilinearly moved by the linear actuator include a gate valve (not shown) in addition to the valve body 33 and the arm 80 mentioned above. The gate valve may be used as a partition between a load-lock chamber and a process chamber or as a partition between a conveyance chamber and a process chamber in a semiconductor manufacturing apparatus which utilizes plasma. Even in this case, the gate valve can be rectilinearly moved by the linear actuator while a vacuum level is maintained within the vacuum chamber 40. Thus, the gate can be opened and closed without involvement of deterioration in vacuum level within the vacuum chamber 40.

The linear actuator A in the first embodiment is described while referring to the vacuum control valve for use with the vacuum chamber 40 adapted to perform an etching process by use of plasma. However, application of the linear actuator is not limited thereto. The above-mentioned linear actuator can be applied to the vacuum control valve for use with the vacuum chamber 40 which handles plasma.

In the first embodiment, the linear actuator A generates drive force by use of working air; however, an electric motor may be used for driving. The above-mentioned configuration can be widely applied to linear actuators which rectilinearly move a poppet-type valve body. A control device for controlling the linear actuator can be mounted in the form of a control unit (control unit) which controls the supply of electric power to an electric motor or controls the supply of working fluid to the valve opening control chamber 36 (control of, for example, an electropneumatic control valve). The control unit is composed of a CPU, memories, computer programs, etc.

Working fluid is not limited to working air. Examples of working fluid include other gases (gases or liquids) such as nitrogen gas.

In the above embodiments, the stroke limiting surface 84 of the head cover 81 and the stroke limiting end portion 56 of the operating section 30 determine the amount of movement (lift La) such that the piston rod 31 has the first slide range Lb. However, the piston rod 31 may not have the first slide range Lb by means of bringing the stroke limiting surface 84 and the stroke limiting end portion 56 closer to each other. In this case, since the second slide range Lc which faces both of the vacuum chamber 40 and the vacuum slide chamber S or the valve opening control chamber 36 is shortened, the second slide range Lc can reside within the vacuum slide chamber S.

The former has an advantage that vacuum evacuation in a molecular region can be performed smoothly, whereas the latter has an advantage that a fail-safe system is provided; specifically, leakage of working fluid can be prevented in a mechanically reliable manner.

Also, there may be prepared a plurality of the head covers 81 which differ in the position of the stroke limiting surface 84, for allowing free limitation of the lift La through selection of a relevant head cover 81. Furthermore, the following configuration may be employed: the position of the stroke limiting surface 84 can be adjusted manually or in an electromotive manner.

In the above embodiments, the cylindrically shaped member 32 is formed of ceramic formed through firing of aluminum oxide. However, the cylindrically shaped member 32 may be formed of, for example, aluminum nitride, aluminum titanate, boron nitride, or zirconia. Use of aluminum oxide (aluminum) readily provides high rigidity and electrical insulation.

In the above embodiments, the cylindrically shaped member 32 covers the piston rod 31 along substantially the overall length in the moving direction of the piston rod 31. However, the cylindrically shaped member 32 may cover a range (the second slide range Lc) of the piston rod 31 which faces both of the interior of the vacuum chamber 40 and the exterior of the vacuum chamber 40 (the vacuum slide chamber S or the valve opening control chamber 36). Thus, if the cylindrically shaped member 32 covers only the second slide range Lc of the piston rod 31, the cylindrically shaped member 32 reduces in size, whereby the cost of material of the cylindrically shaped member 32 can be reduced.

The above embodiments employ the circular columnar piston rod 31 as a moving member. However, the moving member may be a columnar member having an elliptical cross section or a polygonal cross section. Also, the shape of the cover is not limited to a cylindrical shape as in the case of the embodiments. The cover may be a tubular member having an elliptical cross section or a polygonal cross section according to a cross-sectional shape of the moving member.

What is claimed:

1. A linear actuator for use with a vacuum chamber in which plasma is generated, comprising
   a moving member which extends between the exterior and the interior of the vacuum chamber through an opening provided in the vacuum chamber and which is configured to be rectilinearly reciprocated;
   a drive section which is configured to reciprocate the moving member;
   a cover for covering the moving member; and
   a slide seal section for providing a seal between the interior and the exterior of the vacuum chamber while allowing the cover to slide thereon;
   wherein
   the cover covers a range of the moving member which is moved into both of the interior and the exterior of the vacuum chamber in the course of reciprocation of the moving member by the drive section, and
   an outer surface of the cover is smaller in the amount of gas adsorption per unit area than an outer surface of the moving member.

2. The linear actuator according to claim 1, wherein the moving member has an attachment section provided at its end on the side in the interior of the vacuum chamber, the attachment section having an amount of gas adsorption per unit area larger than that of the outer surface of the cover.

3. The linear actuator according to claim 1, wherein the cover comprises an electrically insulating sintered body formed through firing of an electrically insulating nonmetallic material.

4. The linear actuator according to claim 3, wherein the sintered body is formed of ceramic formed through firing of aluminum oxide.

5. The linear actuator according to claim 1, wherein the moving member is formed of a metal material.

6. The linear actuator according to claim 5, wherein the moving member is formed of aluminum.

7. The linear actuator according to claim 2, wherein the attachment section is formed of a metal material whose surface is subjected to surface oxidization.

8. The linear actuator according to claim 7, wherein
   the attachment section is formed of aluminum, and
   the surface oxidization is alumite treatment.

9. The linear actuator according to claim 1, further comprising
   a guide rod connected to the moving member and extending along an axis of the moving member, and
   a guide for guiding the guide rod along a moving direction of the moving member.

10. The linear actuator according to claim 2, further comprising an operation member which is attached to the attachment section and is configured to operate in the interior of the vacuum chamber.

11. The linear actuator according to claim 10, further comprising an insertion passage for allowing a control line for controlling operation of the operation member to be inserted into the operation member from the exterior of the vacuum chamber.

12. The linear actuator according to claim 1, wherein
    the cover is provided such that a predetermined gap is formed between the same and an outer surface of the moving member through a pair of elastic seal members which are disposed away from each other in a moving direction of the moving member, and
    the pair of elastic seal members is elastically in contact with the outer surface of the moving member and seals the predetermined gap.

13. The linear actuator according to claim 1, wherein
    the slide seal section has
    a slide surface on which the cover slides,
    a first slide seal member and a second slide seal member which are disposed away from each other in a moving direction of the moving member and which define a vacuum slide chamber between the slide surface and the cover, and
    a vacuum evacuation channel which communicates with the vacuum slide chamber;
    the first slide seal member is in contact with an outer surface of the cover and provides a seal between the vacuum slide chamber and the interior of the vacuum chamber;
    the second slide seal member is in contact with the outer surface of the cover and provides a seal between the vacuum slide chamber and the exterior of the vacuum chamber as well as the exterior of the vacuum slide chamber; and
    the vacuum slide chamber is vacuum-evacuated through the vacuum evacuation channel.

14. The linear actuator according to claim 13, wherein the first slide seal member has an elastic member having a forked lip whose lip pieces are in contact with the slide surface and the cover, respectively, and
    an urging member which urges the lip pieces of the forked lip toward mutually opposite directions.

15. A vacuum control device comprising
    a control unit for controlling a linear actuator according to claim 13,
    wherein the control unit has a conductance adjustment mode for controlling the drive section such that a range of the moving member which is moved into the interior of the vacuum chamber in the course of reciprocation of the moving member by the drive section is moved within a range from the interior of the vacuum chamber to the interior of the vacuum slide chamber.

16. The vacuum control device according to claim 15, wherein the control unit has a desorption mode for, before start of the conductance adjustment mode, vacuum-evacuating the vacuum slide chamber through the vacuum evacuation channel for a predetermined period of time in a condition in which a range of the moving member having been moved from the interior of the vacuum chamber to the exterior of the vacuum slide chamber in the course of reciprocation of the moving member by the drive section is moved into the vacuum slide chamber.

17. The linear actuator according to claim 1, wherein
    the drive section comprises
    a cylinder which is disposed externally of the vacuum chamber and into which working fluid flows,
    a piston disposed within the cylinder in such a manner as to define a working chamber, and being configured to be moved within the cylinder by pressure of the working fluid supplied into the working chamber, and an urging member being configured to urge the piston toward the vacuum chamber; and the moving member is connected to the piston.

* * * * *